Sept. 4, 1962 R. SIMON ET AL 3,052,429
HIGH FLOTATION LANDING GEAR
Filed Oct. 1, 1958 4 Sheets-Sheet 1

INVENTORS
RALPH SIMON
BY JOHN E. VOORHEES
JOSEPH A. HOESS
VINCENT C. FRISBY

Brumbaugh, Free, Graves & Donohue
their ATTORNEYS

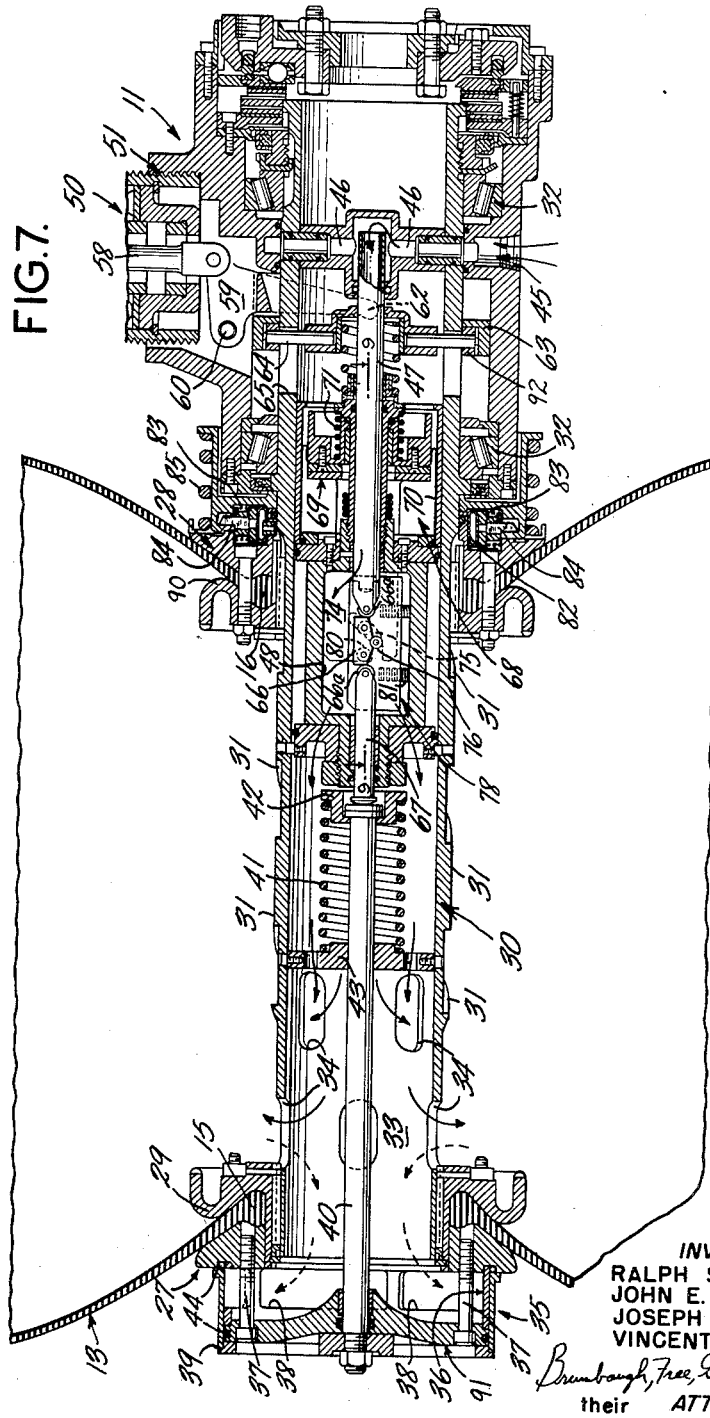

Sept. 4, 1962 R. SIMON ET AL 3,052,429
HIGH FLOTATION LANDING GEAR
Filed Oct. 1, 1958 4 Sheets-Sheet 3
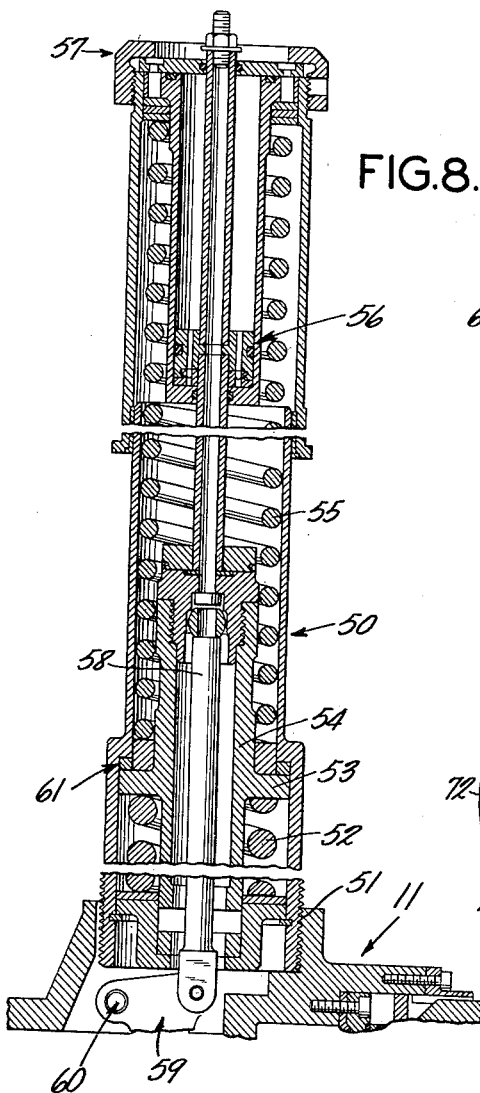
FIG.8.
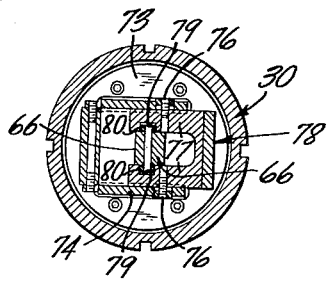
FIG.10.
FIG.11.
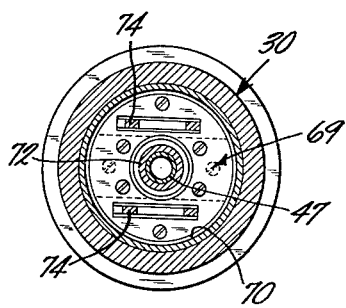
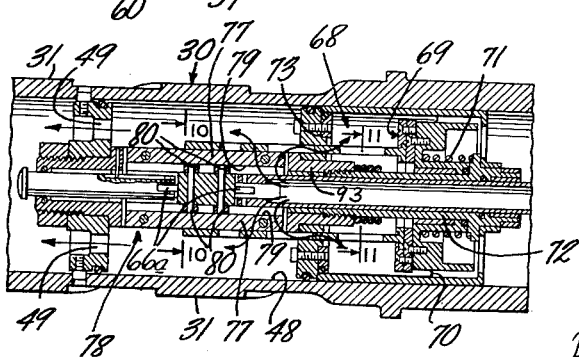
FIG.9.
INVENTORS
RALPH SIMON
BY JOHN E. VOORHEES
JOSEPH A. HOESS
VINCENT C. FRISBY
their ATTORNEYS

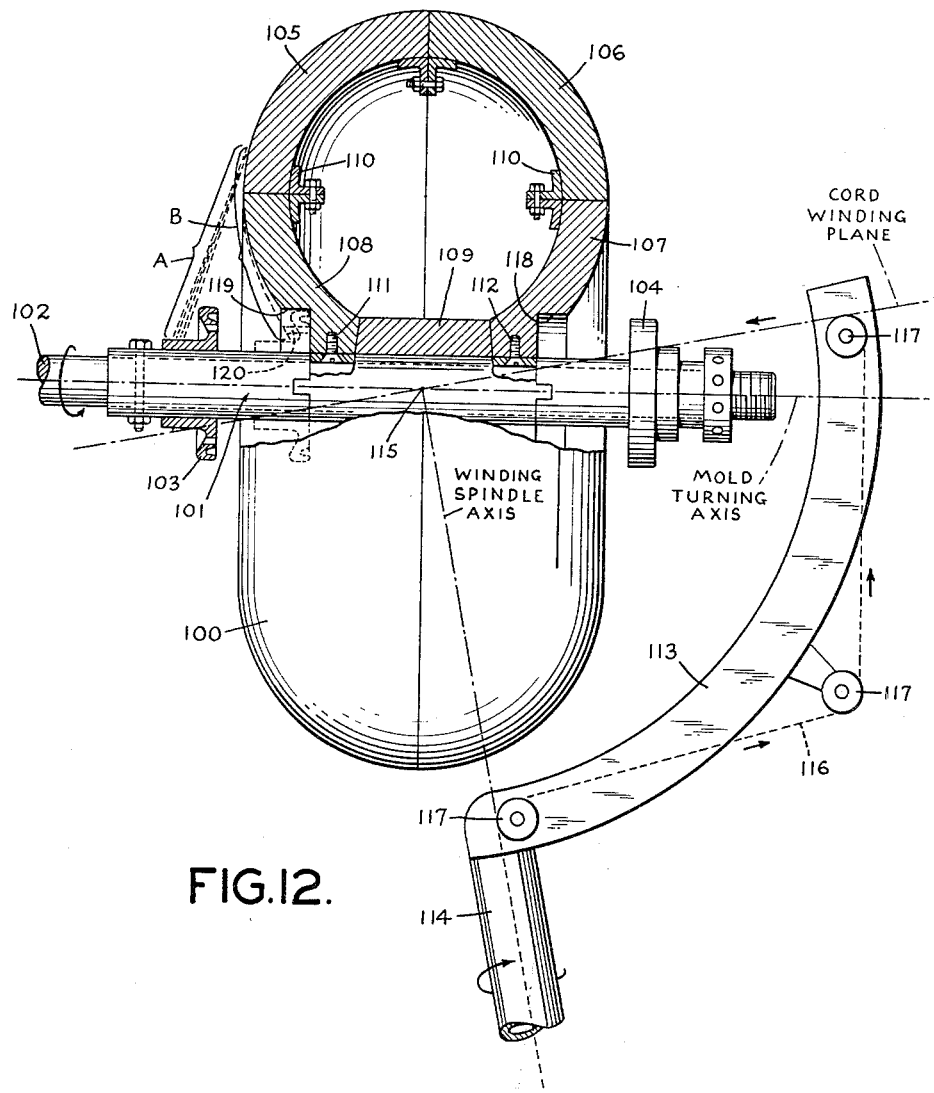

United States Patent Office 3,052,429
Patented Sept. 4, 1962

3,052,429
HIGH FLOTATION LANDING GEAR
Ralph Simon, John E. Voorhees, and Joseph A. Hoess, all of Columbus, Ohio, and Vincent C. Frisby, Hagerstown, Md., assignors, by direct and mesne assignments, to Fairchild Stratos Corporation, a corporation of Maryland
Filed Oct. 1, 1958, Ser. No. 764,578
21 Claims. (Cl. 244—103)

This invention relates to aircraft landing gear and, more particularly, to a new and improved type of landing gear utilizing high-flotation tires especially adapted for aircraft operations from unimproved fields.

Generally, aircraft utilizing conventional landing gear having relatively small high-pressure tires require a smooth, hard landing surface and cannot operate from rough, unprepared fields. Even though the terrain may appear smooth, hard, and level from the air, if a landing is attempted such tires may encounter protruding rocks, small stumps, ruts or ditches resisting the forward motion of the tires sufficiently to tear away the landing gear or overturn the aircraft. Furthermore, the terrain may be composed of water-saturated soil which would resist forward motion of the tires in a similar manner and also cause a stationary aircraft to sink so that it would be impossible to take off.

These difficulties encountered in aircraft operations from unprepared fields can be effectively eliminated by providing the aircraft with landing gear having high-flotation tires of substantial size and inflated to a low pressure. Such tires are capable of providing an area of contact with the landing surface, or "footprint area," sufficiently large to span any of the surface irregularities referred to above. Large tires of this type, however, if constructed in the usual manner, would have unacceptably high weight. In addition, such tires produce a substantial amount of aerodynamic drag while the aircraft is in flight and, therefore, must be deflated and folded for in-flight storage. Also, the resilience of large, low-pressure tires produces an undesirable vertical rebound effect during landing which must be damped out.

Accordingly, it is an object of this invention to porvide a new and improved aircraft landing gear utilizing high-flotation tires.

Another object of the invention is to provide aircraft landing gear of the above character capable of controlling the resilience of high-flotation tires to prevent rebound effect.

A further object of the invention is to provide a high-flotation tire capable of being deflated and folded to occupy a small fraction of its inflated volume.

Still another object of the invention is to provide landing gear for aircraft capable of deflating and folding a high-flotation tire when the aircraft is in flight and unfolding and inflating the tire for landing.

Yet another object of the invention is to provide tire building techniques for manufacturing high-flotation tires for use in the above landing gear, and for other purposes, which tires have substantially less weight and are less costly than conventional high-flotation tires.

A still further object is to provide a high-flotation tire of much smaller hub or bead diameter relative to the outer diameter of the tire than found in conventional high-flotation tires to provide for greater deflection for decelerating the sinking speed of the aircraft when landing and making it possible for the tire to travel over large obstacles on rough, unimproved landing areas.

It is an additional object to provide a high-flotation tire having a positive means of attachment of the tire to the hubs to prevent the loss of inflation air between the bead and the hub when inflated to low pressures.

These, and other objects of the invention, are accomplished by providing aircraft with a high-flotation tire and including an air-bleeding valve in the landing gear. The air-bleeding valve is controlled by a load-sensing device or strut, which detects the load transmitted from the tire to the aircraft, and by a pressure-sensitive device preventing operation of the bleeding valve when the tire pressure is below a predetermined value. In addition, the landing gear includes an axle on which the tire is mounted having hubs arranged to provide relative rotation to twist the tire so that it collapses into a small volume for storage.

High-flotation tires for use with the landing gear are constructed so that the cord reinforcements are directed at an angle to the radii of the tire. Specifically, a continuous cord reinforcement is wound from the bead on one side of the tire at some angle across the center tread line to the bead on the other side of the tire at a point across the axle from the starting point, approaching each bead approximately tangentially. Furthermore, the tire may be provided with elastic bands extending from one side of the tire to the other at an angle to a radial plane of the tire to facilitate the collapsing and folding operation.

Further objects and advantages of the invention will be apparent from a reading of the following description in conjunction with the accompanying drawings in which.

Figure 1:
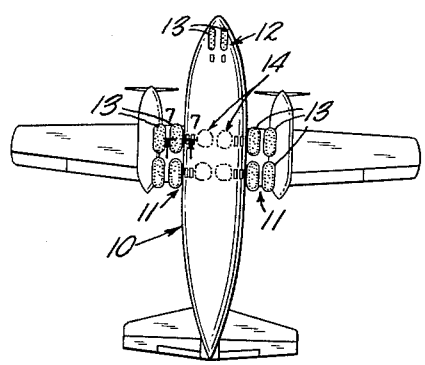
FIG. 1 is a view of the bottom of an aircraft provided according to the invention with landing gear carrying high-flotation tires.
Figure 3:
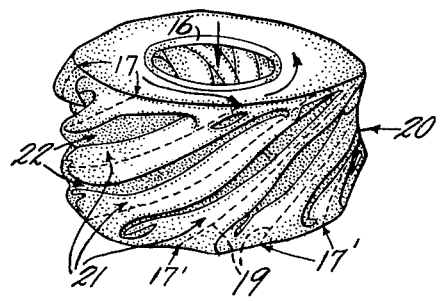
Figure 2:
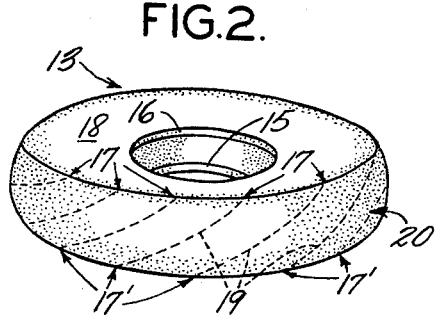
FIG. 2 is a view in perspective of a typical high-flotation tire arranged according to the invention.
Figure 5:
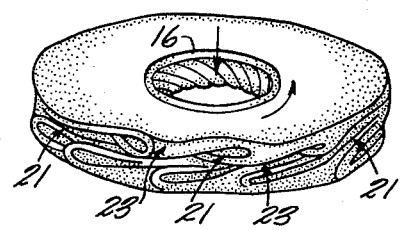
Figure 6:
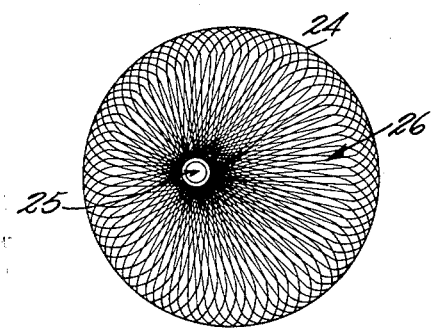
Figure 4:
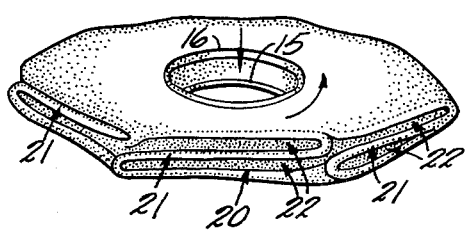

FIGS. 3, 4, and 5 illustrate the tire of FIG. 2 in various conditions during folding of the tire;

FIG. 6 is a perspective view illustrating the arrangement of the reinforcing cords in the tire of FIGS. 2–5;

FIG. 7 is a sectional view taken on the lines 7—7 of FIG. 1 illustrating a portion of aircraft landing gear arranged according to the invention;

FIG. 8 is a sectional view illustrating another portion of the landing gear shown in FIG. 7;

FIG. 9 is a view in axial section taken on the lines 9—9 of FIG. 7;

FIG. 10 is a view in transverse section taken on the lines 10—10 of FIG. 9;

FIG. 11 is a transverse sectional view taken on the lines 11—11 of FIG. 9 and looking in the direction of the arrows; and FIG. 12 is a view, partially in section, illustrating the method of winding the cord of the tire on the form or mold.

As illustrated in FIG. 1, an aircraft 10 is arranged according to the invention for operation from unimproved fields by providing it with landing gear 11, 12 carrying a plurality of high-flotation tires 13. Each of the high-flotation tires 13 is of the low-pressure type and is substantially larger than conventional high-pressure tires so that when inflated the footprint area is great enough to span the surface irregularities of an unprepared field. The landing gear 11 is arranged in the usual manner to retract the tires to the storage positions 14, for example, after the aircraft is airborne and the tires have been deflated and folded, as described hereinafter.

A typical tire 13 arranged to be used with the landing gear of the invention is shown in FIG. 2. This tire includes two beads 15 and 16 at the center of its side walls and is arranged, as described below, so that the concentration of reinforcement cords is high near the beads and diminishes toward the circumference of the tire. All cords are tangent at the hub or bead of the tire. By this technique, a balanced design in the tire may be obtained in that the maximum stress in all cords throughout the tire is about equal for the most severe tire deflections expected during service. Extending from selected points 17 at the periphery of one side wall 18 of the tire to points 17' angularly spaced therefrom on the periphery of the opposite side wall is a plurality of elastic bands 19, arranged to be stretched whenever the tire is in the unfolded condition shown in FIG. 2. These bands are utilized in the preferred embodiment of the invention to assist in folding and may extend through the flexible tread portion 20 of the tire or across the interior of the tire from one side wall to the other.

In order to fold the tire 13, the tire beads 15 and 16 are rotated relatively and moved together, as indicated by the arrows in FIGS. 3, 4 and 5. In the first stage of the folding operation, illustrated in FIG. 3, the tread portion 20 of the tire is twisted into folds 21 and creases 22 extending at an angle to the axial and radial planes of the tire. During this stage, the tension of the stretched elastic bands 19 exerted at the points 17 and 17' causes the tire to dimple at these points so that the folds 21 and creases 22 extend angularly across the tread portion 20 in preparation for subsequent stages of the folding operation.

Further relative rotation of the beads 15 and 16 while they are brought closer together results in a flattening of the tire with the tread portion 20 folded inwardly as illustrated in FIG. 4. If the rotary and axial motions of the beads are continued, as shown in FIG. 5, the tire forms a collapsed helical bellows and is further reduced in volume as required for storage of the tire. By rotating its sides relatively in this manner, a tire arranged in accordance with the invention can be reduced in volume to less than one-fifth its inflated size and, therefore, can be conveniently retracted for storage in flight.

Alternatively, tension means may be provided to exert a radially inward force on the inner face of the tread portion of the tire, at equidistant angularly spaced points. This tension means causes the tire to dimple at these points upon deflation of the tire. Continued deflation to a subatmospheric pressure causes the dimples to become creases and results in the folding of the tire without other external forces being applied. The folding action, including the rotation of one bead relative to the other with their consequent approach toward one another occurs as described above, although external motivation is not required.

Inasmuch as high-flotation tires used in aircraft landing gear are subjected to exceptionally high stresses in the area near the beads of the tire, it is important to provide a high concentration of internal reinforcement cords in this area. At the same time, the weight of the tire must be kept at a minimum. In order to satisfy these conditions, tires intended for use with the invention are preferably constructed with reinforcement cords arranged in the manner illustrated in FIG. 6 wherein the rubber coating has been removed from the cords for purposes of illustration.

In the tire illustrated in FIG. 6, a single reinforcement cord 24 is wound continuously from one side of a hub 25 at one side of the tire to the opposite side of the hub on the other side of the tire, on a suitable rotatable form or mold by a cord winding arm so that the cord extends at an angle to the radius of the tire along each side wall. Thus, the cord approaches the hub approximately tangentially and forms a criss-cross pattern 26 with the cord segments spreading outwardly from the bead in each side wall in a manner similar to the spokes of a bicycle wheel. It will be apparent that tires fashioned in this manner have extremely high strength in the area of the beads and yet are relatively light in weight and are highly flexible.

FIG. 12 illustrates schematically the continuous cord method of building the present tire in which the tire is constructed upon a form or mold 100 which has the toroidal shape of the finished tire. Unlike the procedure used in the past in manufacturing conventional tires, in which the tire is constructed on a barrel-shaped form and then deformed and cured in a final, different shape, the tire of the present invention is both constructed on and cured on the same mold. By curing the tire in the shape in which it is constructed, it is possible to accurately control the placement of cords in the tire, and thus the inflated shape of the tire, and insure that the finished tire will be perfectly symmetrical.

In building the tire, the mold 100 is suitably attached to a cylindrical hollow three-part splined sleeve 101 which is mounted on, and rotates with, a spindle 102 in the direction indicated by a suitable driving motor (not shown), the speed of which can be accurately controlled. A pair of hubs 103, 104 are positioned, one on each of the two outer sleeves and spaced apart from the mold a distance such that the straight line distance "A" of the tire cord when wound into place will equal the curved line distance "B" when the hubs 103, 104 are pushed into curing position (as indicated by broken line), after winding is completed. The mold 100 is constructed of a plurality of separate pieces 105, 106, 107, 108, 109 joined together, for example, by suitable flanged fittings 110 bolted together and the entire mold is attached to the center sleeve 101 as by screws 111 and 112. The purpose of the multipart mold is to facilitate the removal of the mold from the finished tire after curing. In actual practice, the bolted connections illustrated, holding the separate mold pieces together, could be replaced with other types of fastenings, as for example, the familiar trunk-latch type, which would be quicker acting and serve to increase the rate of production. A cord winding arm 113 is attached to, and rotates with, a winding spindle 114 which turns on an axis passing through the centroid of the tire mold 115. The winding spindle is rotated in the direction indicated by a suitable motor (not shown). Both the speed of the cord-winding spindle motor, and the motor which drives the tire mold, should be controllable in order that the speed of one with respect to the other can be varied to vary the cord pattern laid down on the mold as may be desired. A continuous cord 116 is fed through the spindle 114 about suitable pulley wheels 117 to the end of the winding arm 113 and is wound about the mold and the two hubs in a plane which passes through the rear side of one hub, the centroid of the tire mold, and the opposite side of the other hub, as illustrated in the drawing FIG. 12.

When winding is complete, the two hubs 103, 104 are disconnected from, and slid inwardly on, the sleeves into the recesses 118 and 119 in the mold. The three-part sleeve, with the mold and its winding, is next removed from the mold spindle and after the necessary lay-up of rubber over the cord windings, the entire unit is cured. After curing, the mold is disconnected from the sleeve 101 by removing the screws 111 and 112 whereupon the center piece 109 of the mold will drop away and provide access to the inner connections holding the several parts of the mold together. The individual mold pieces may then be removed through the hub of the finished tire.

It can be seen that the outer surface of the mold determines the inner surface of the tire during the cure and, when the tire is in use, the hubs upon which the cord is wound become the rim or complete wheel, at least in certain applications. It may be desirable, when very low inflation pressures are to be used, to pierce the tire through the bead portion, prior to cure, with a plurality of bolt holes 120 to provide for the use of suitable clamping means between the beads and the hubs to assure a more air-tight seal between the tire and the hub for preventing the escape of air by any displacement of the tire beads relative to the hubs.

As best seen in FIG. 7, the tire 13 is mounted on the landing gear 11 by outer and inner hubs 29 and 90 wherein the bead portions 15 and 16, respectively, are retained by suitable clamps 27 and 28. The inner hub 90 is slidably supported on a hollow axle 30 by helical splines 31 while the outer hub 29 is fixedly mounted on the axle. The axle 30, which is rotatably supported on the landing gear 11 by suitable roller bearings 32, includes a chamber 33 communicating with the interior of the tire 13 through openings 34 in the axle.

At the outer end of the axle, a bleed valve 35 comprises an inner sleeve member 36 and an axle end plate 91 affixed to the clamp 27 as by bolts 37 and communicating with the chamber 33. The series of ports 38 in the inner sleeve member 36, normally covered by an outer sleeve member 39, is arranged to open the chamber 33 to the atmosphere when the outer sleeve member is moved away from the clamp 27 by axial motion of a support shaft 40. This shaft is normally urged to the right, as viewed in FIG. 7, by a spring 41 extending from a flange member 42 at the inner end of the shaft 40 to a spider 43 mounted within the hollow axle 30, thereby holding the outer sleeve member 39 against the clamp 27 to retain the valve 35 in the closed condition. Suitable gasketing 44 between the outer sleeve member 39 and the inner sleeve member 36 and between the outer sleeve member and the clamp 27 is arranged to form an air-tight seal when the valve is closed. Opening of the valve 35 by motion of the shaft 40 to the left permits air to pass from the tire 13 through the openings 34 into the chamber 33 and from there through the ports 38 to the atmosphere, as indicated in the drawings by the dash arrows.

When the tire 13 is to be inflated, air from a suitable source of compressed air (not shown) is supplied to an inlet port 45 in the landing gear 11 from which it passes inwardly through radial passages 46 in the axle 30 to one end of a tube 47. As indicated by the solid arrows in the drawings, the air passes from the other end of the tube 47 into a chamber 48 and from there through passages 49, illustrated in FIG. 9, and the spider 43 into the chamber 33 which communicates with the interior of the tire. Compressed air supplied to the inlet port 45, preferably under the control of the aircraft pilot, inflates the high-flotation tire 13 to a predetermined, relatively high, pressure, for example, 17 p.s.i., when the aircraft is preparing for a landing. If desired, this tire inflation can be performed automatically in connection with the lowering of the landing gear.

As the axle 30 descends toward the ground during a landing with the tread portion of the tire 13 in contact with the ground, the tire begins to compress and air starts to bleed out, absorbing the shock and reducing the load factors resulting from the vertical momentum of the aircraft so that the sinking speed of the aircraft is reduced, which may be greater than ten feet per second, for example, to zero. Compression of the tire without reducing pressure when it is inflated to a relatively high pressure, such as 17 p.s.i., can cause an undesirable rebound effect unless the tire pressure is substantially reduced while the tire is being compressed. Accordingly, a load-sensing strut assembly 50, illustrated in detail in FIG. 8, is joined at its lower end 51 to the landing gear 11 and at its upper end, through a suitable linkage, to the aircraft and is arranged to operate the valve 35 in the manner described below to decrease the tire pressure in accordance with the load transmitted to the aircraft.

Within the load-sensing strut assembly 50, vertical forces are transmitted from the landing gear 11 through a load-sensing spring 52 to a flange 53 formed on a sleeve 54. A conventional taxi spring 55 and dash-pot damper 56 connect the sleeve 54 with the upper portion 57 of the load-sensing strut. Centrally positioned within the sleeve 54 a shaft 58 is connected at one end to the sleeve and at the other end to a bell crank 59, which is pivotally supported on the landing gear 11 at a fulcrum 60. Therefore, downward motion of the sleeve 54 with respect to the landing gear 11 when a load is transmitted through the strut assembly pivots the bell crank 59. However, the load-sensing spring 52 is installed with a preload urging the flange 53 upwardly against a shoulder 61 in the strut so that the bell crank 59 cannot pivot until the combined force absorbed by the taxi spring 55 and the dash pot 56 is equal to the preload.

Taxi spring 55 and dash pot 56 may alternatively be omitted from the load-sensing device. If sleeve 54 were arranged to be attached at its upper end the aircraft with taxi spring 55 and dash pot 56 absent, the operation of the air-bleed valve 35 with respect to load on the landing gear 11 would be the same. Taxi spring 55 and dash pot 56 merely make available additional vertical travel in which to arrest the vertical velocity of the aircraft.

The preload of the sensing spring 52 is selected so that the spring is compressed when the load transmitted through the strut assembly 50 and, therefore, that applied to the tire 13, is greater than a predetermined value, for example, ½ times the static load to be supported by the tire. The consequent rotation of the bell crank 59 moves the lower end 62 of the crank, illustrated in dash lines in FIG. 7, against a non-rotating ring 63 surrounding the axle 30 and drives the ring to the left as viewed in the drawings. Inasmuch as the ring 63 bears against ring 92 which is joined to the tube 47 by pins 64 extending through slots 65 in the axle and the tube 47 transmits motion through a wedge block 66 and two rollers 66a to a push rod 67 abutting the inner end of the shaft 40, strut loads exceeding the preload of the spring 52 drive the tube 47, wedge block 66, push rod 67 and shaft 40 to the left, compressing the spring 41 and opening the bleed valve 35 to permit air to escape from the tire 13.

In order to monitor the pressure in the tire 13 after it contacts the ground and as the axle 30 descends toward the ground, a pressure-sensing unit 68 is mounted within the axle, as shown in FIGS. 7, 9, 10, and 11. Within this unit, a piston 69 and a flexible diaphragm 70 supported between the piston and the inside of the axle 30 are exposed on one side to the air pressure in the tire and on the other side to atmospheric pressure. A compression spring 71 extending from a sleeve 72, which is affixed to the axle 30 through a frame 93 and a spider plate 73, to the atmosphere side of the piston 69, opposes the force produced by the tire pressure. When the pressure in the tire falls to a desired minimum value, selected to provide optimum tire-rolling characteristics on unimproved terrain, for example, 2 p.s.i., the spring 71 drives the piston 69 to the left, as viewed in FIGS. 7 and 9, to close the valve 35 in the manner described below.

Two cam plates 74 mounted on piston 69 extend through the spider 73 into the chamber 48 and, as best seen in FIG. 7, each of these plates includes a cam slot 75 extending horizontally in one portion and inclined upwardly in another portion. Two cam followers 76 mounted on the side plates 77 of a wedge-block guide member 78 extend into these cam slots, the side plates 77 also having longitudinal internal slots 79 into which the wedge block 66 is guided for axial motion by rollers 80 affixed thereto. In addition, as shown in FIG. 7, 4 coil springs 81 urge the guide member 78 upwardly within the chamber 48.

Therefore, when the force of the piston spring 71 is greater than the differential pressure loading on the piston 69, the piston 69 is driven to the left and the upwardly inclined portion of the cam slots 75 permits the springs 81 to force the wedge-block guide member 78 upwardly in the chamber 48. This removes the wedge block from its position between the tube 47 and the push rod 67 so that the spring 41 closes the valve 35 and the valve cannot be opened again until the wedge block is returned to its position between the members 47 and 67. By appropriate selection of the springs 81, the tire pressure required to return the piston 69 and the cam plate 74 to the right and reset the wedge block may be set at any desired value. In the preferred embodiment of the invention, a tire pressure of approximately 12 p.s.i. is necessary to reset the wedge block. With this arrangement, the tires of an aircraft on the ground may be inflated to any value below 12 p.s.i. for take-off and the bleed valve 35 will remain inoperative even though vertical shocks in excess of the preload of the spring 52 are transmitted through the strut assembly 50.

When the aircraft is off the ground, the landing gear 11 automatically folds the tire 13 into a small volume in the manner described above. This operation is initiated by deflating the tire through the hollow axle 30 and air-inlet port 45. Deflation of the tire collapses a flexible tube 82 mounted within the inner clamp 28 and communicating with the interior of the tire, thereby permitting coil springs 83 to disengage latches 84 which hold the clamp in position on the axle. With latches 84 thus released, a tire-folding spring 85 urges the inner hub 90 outwardly upon the axle 30, driving the two tire beads 15 and 16 together. At the same time, the helical splines 31, on which the hub 90 is slidably mounted, rotate the hub, thereby twisting the bead 16 with respect to the bead 15 to fold the tire in the manner illustrated in FIGS. 3, 4, and 5.

In addition, the spring 85 is arranged to twist in the same direction as the splines while it expands, thus rotating the hub 90 in the proper direction in addition to moving it outwardly. Inasmuch as a very slight air pressure in the tire will overcome the force of the spring 85, the tire is unfolded by inflating it through the inlet port 45. Air pressure within the tire drives the hub 90 to the right, separating the beads 15 and 16, while the splines 31 rotate the hub 90 in the direction to unfold the tire. When the hub 90 has been driven to its extreme right-hand position, the latches 84 are engaged and thereafter the air pressure in the tubing 82 retains the latches in the locked position, holding the hub securely in position on the axle 30.

In operation, the aircraft pilot prepares the landing gear 11, for landing on an unimproved field by applying air pressure through the port 45 to unfold the tire 13 and inflate it to a pressure greater than that required to reset the wedge block 66, such as 17 p.s.i., for example. When the inflated tire contacts the ground and the force transmitted to the aircraft through the strut 50 due to the descent of the aircraft on to the ground is greater than the preload of the spring 52, the bell crank 59 opens the valve 35 by driving the shaft 40 and the push rod 67 to the left through the wedge block 66 and the tube 47.

After the pressure in the tire 13 has been reduced to a selected value appropriate for operation on unprepared terrain as detected by the pressure-sensing unit 68, the piston spring 71 forces the piston 69 to the left, thus permitting the springs 81 to drive the guide member 73 upwardly in the cam slot 75. This removes the wedge block 66 from its position between the tube 47 and push rod 67, thereby permitting the spring 41 to drive the shaft 40 to the right, closing the bleed valve 35. With the wedge block 66 thus displaced from the linkage between the bleed valve and the bell crank 59, the valve 35 remains closed regardless of the load transmitted by the load-sensing strut 50.

In order to retract the landing gear after the aircraft has left the ground, the air within the tire 13 and the tubing 82 is released through the port 45 permitting the springs 83 to disengage the latches 84. With the hub 90 thus released from its position on the axle 30, the tire-folding spring 85 drives the hub to the left, rotating it on the splines 31 to fold the tire in the manner previously described.

Although the invention has been described herein with reference to a specific embodiment, many modifications and variations therein will readily occur to those skilled in the art. For example, it is contemplated that more than one cord will be wound into place simultaneously by skewing the axis of rotation of the mold so that the winding plane becomes horizontal and rotating the whole assembly about a vertical axis through the center of symmetry of the mold, thereby appreciably shortening the time required to wind a tire and substantially reduce the cost thereof. Accordingly, all such variations and modifications are included within the intended scope of the invention as defined by the following claims.

What is claimed is:

1. Landing gear for aircraft comprising an axle, pneumatic tire means mounted on the axle, strut means connecting the axle with the aircraft, bleed-valve means communicable with the atmosphere and with the interior of the tire means, and load-sensing means for opening the bleed-valve means in response to loads transmitted through the strut means exceeding a predetermined value.

2. Landing gear for aircraft comprising an axle, pneumatic tire means mounted on the axle, strut means connecting the axle with the aircraft, a chamber within the axle communicating with the interior of the tire means, normally closed bleed-valve means mounted on the axle communicating with the atmosphere and with the chamber, and load-sensing means for opening the bleed-valve means in response to loads transmitted through the strut means exceeding a predetermined value.

3. Landing gear for aircraft comprising an axle, pneumatic tire means mounted on the axle, normally closed bleed-valve means communicable with the atmosphere and with the interior of the tire means, load-sensing means for opening the bleed-valve means in response to axle loads exceeding a predetermined value, and pressure-responsive means for rendering the bleed-valve means inoperative when the tire pressure falls below a predetermined value.

4. Landing gear for aircraft comprising an axle, pneumatic tire means mounted on the axle, strut means connecting the axle with the aircraft, bleed-valve means on the axle communicable with the atmosphere and with the interior of the tire means, load-sensing means responsive to loads transmitted through the strut means exceeding a predetermined value, connecting means including a displaceable link within the axle for opening the bleed-valve means in response to operation of the load-sensing means, and pressure-responsive means for displacing the displaceable link to disable the connecting means.

5. Landing gear for aircraft comprising an axle, pneumatic tire means mounted on the axle, normally closed bleed-valve means communicable with the atmosphere and with the interior of the tire means, load-sensing means responsive to axle loads exceeding a predetermined value, connecting means including a displaceable link for opening the bleed-valve means in response to operation of the load-sensing means, pressure-sensitive means including a piston responsive to the tire pressure, and cam means movable with the piston to displace the displaceable link to render the connecting means inoperative when the tire pressure falls belows a predetermined value.

6. Landing gear for aircraft comprising an axle, a high-flotation pneumatic tire adapted to absorb landing shocks at relatively high pressures and to roll over unimproved terrain at a selected low pressure, bleed-valve means communicable with the interior of the tire and with the atmosphere, load-sensing means responsive to axle loads exceeding a predetermined value, and connecting means for opening the bleed-valve means in response to operation of the load-sensing means.

7. Landing gear for aircraft comprising an axle, a high-flotation pneumatic tire adapted to absorb landing shocks at relatively high pressures and to roll over unimproved terrain at a selected low pressure, bleed-valve means communicable with the interior of the tire and with the atmosphere, load-sensing means responsive to axle loads exceeding a predetermined value, connecting means for opening the bleed-valve means in response to operation of the load-sensing means, and pressure-sensitive means responsive to the pressure in the tire for disabling the connecting means when the tire is deflated to the selected low pressure.

8. Landing gear for aircraft comprising an axle, a high-flotation pneumatic tire adapted to absorb landing shocks at relatively high pressures and to roll over unimproved terrain at a selected low pressure, bleed-valve means communicable with the interior of the tire and with the atmosphere, load-sensing means responsive to axle loads exceeding a predetermined value, connecting means for opening the bleed-valve means in response to operation of the load-sensing means, and pressure-sensitive means responsive to the pressure in the tire for disabling the connecting means when the tire is deflated to the selected low pressure and maintaining the connection means disabled until the tire pressure is increased to a predetermined higher pressure.

9. Landing gear for aircraft comprising an axle, a high-flotation pneumatic tire adapted to absorb landing shocks at relatively high pressures and to roll over unimproved terrain at a selected low pressure, bleed-valve means communicable with the interior of the tire and with the atmosphere, load-sensing means responsive to axle loads exceeding a predetermined value, connecting means including a displaceable link for opening the bleed-valve means in response to operation of the load-sensing means, piston means responsive to the tire pressure, and cam means movable with the piston means for displacing the displaceable link to disable the connecting means when the tire is deflated to the selected low pressure.

10. Landing gear for aircraft comprising an axle, a high-flotation pneumatic tire adapted to absorb landing shocks at relatively high pressures and to roll over unimproved terrain at a selected low pressure, bleed-valve means communicable with the interior of the tire and with the atmosphere, load-sensing means responsive to axle loads exceeding a predetermined value, connecting means including a displaceable link for opening the bleed-valve means in response to operation of the load-sensing means, piston means responsive to the tire pressure, and cam means movable with the piston means for displacing the displaceable link to disable the connecting means when the tire is deflated to the selected low pressure and restoring the displaceable link when the tire is inflated to a predetermined higher pressure.

11. Landing gear according to claim 10 including spring bias means urging the displaceable link in the direction to disable the connecting means.

12. Landing gear for aircraft comprising an axle, helical spline means on the axle, a high-flotation pneumatic tire having two tire beads adapted to be folded by relative rotation of the tire beads, first hub means supporting one tire bead in fixed position on the axle, second hub means affixed to the other tire bead and mounted on the helical spline means, and spring means for driving the two hub means together when the tire pressure falls below a predetermined value.

13. Landing gear for aircraft comprising an axle, helical spline means on the axle, a high-flotation pneumatic tire having two tire beads adapted to be folded by relative rotation of the tire beads, first hub means supporting one tire bead in fixed position on the axle, second hub means affixed to the other tire bead and mounted on the helical spline means, spring means for driving the two hub means together when the tire pressure falls below a predetermined value, and latch means normally holding the second hub means in fixed position on the axle, responsive to the tire pressure to release the second hub means when the pressure falls below the predetermined value.

14. Landing gear according to claim 13 including flexible tubing communicating with the interior of the tire arranged to urge the latch means into the engaged position when the tire pressure is greater than the predetermined value.

15. Landing gear for aircraft comprising an axle, helical spline means on the axle, a high-flotation pneumatic tire having two tire beads adapted to be folded by relative rotation of the tire beads, first hub means supporting one tire bead in fixed position on the axle, second hub means affixed to the other tire bead and mounted on the helical spline means, spring means for driving the two hub means together when the tire pressure falls below a predetermined value, bleed-valve means communicable with the atmosphere and with the interior of the tire, and load-sensing means for opening the bleed-valve means in response to axle loads exceeding a predetermined value.

16. Landing gear for aircraft comprising an axle, helical spline means on the axle, a high-flotation pneumatic tire having two tire beads adapted to be folded by relative rotation of the tire beads, first hub means supporting one tire bead in fixed position on the axle, second hub means affixed to the other tire bead and mounted on the helical spline means, spring means for driving the two hub means together when the tire pressure falls below a predetermined value, bleed-valve means communicable with the atmosphere and with the interior of the tire, strut means connecting the axle with the aircraft, and load-sensing means for opening the bleed-valve means in response to loads transmitted through the strut means exceeding a predetermined value.

17. Landing gear for aircraft comprising an axle, helical spline means on the axle, a high-flotation pneumatic tire having two tire beads adapted to be folded by relative rotation of the tire beads, first hub means supporting one tire bead in fixed position on the axle, second hub means affixed to the other tire bead and mounted on the helical spline means, spring means for driving the two hub means together when the tire pressure falls below a predetermined value, bleed-valve means communicable with the atmosphere and with the interior of the tire, load-sensing means for opening the bleed-valve means in response to axle loads exceeding a predetermined value, and pressure-responsive means for rendering the load-sensing means inoperative when the tire pressure falls below a predetermined value.

18. Landing gear for aircraft comprising an axle, helical spline means on the axle, a high-flotation pneumatic tire having two tire beads adapted to be folded by relative rotation of the tire beads, first hub means supporting one tire bead in fixed position on the axle, second hub means affixed to the other tire bead and mounted on the helical spline means, spring means for driving the two hub means together when the tire pressure falls below a predetermined value, bleed-valve means communicable with the atmosphere and with the interior of the tire, load-sensing means for opening the bleed-valve means in response to axle loads exceeding a predetermined value, and pressure-responsive means for rendering the load-sensing means inoperative when the tire pressure falls below a predetermined value and resetting the load-sensing means thereafter when the tire pressure increases above another value.

19. In landing gear for aircraft, a high-flotation tire comprising relatively rigid bead portions and a flexible tread portion capable of being folded by relative rotation of the bead portions to collapse the tire and means in said tread portion for biasing it toward a folded state.

20. Landing gear for aircraft comprising an axle, a high-flotation pneumatic tire adapted to be folded by evacuation of the tire, first hub means supporting one tire bead in fixed position on the axle, second hub means affixed to the other tire bead and rotatably mounted on said axle, and tension means to start the folds when the tire pressure falls below a predetermined value.

21. Landing gear for aircraft comprising an axle, a high-flotation pneumatic tire adapted to be folded by evacuation of the tire, first hub means supporting one tire bead in fixed position on the axle, second hub means affixed to the other tire bead and rotatably mounted on said axle, and tension means to start the folds when the tire pressure falls below a predetermined value and to completely fold the tire when the tire pressure is reduced to a subatmospheric value.

References Cited in the file of this patent

UNITED STATES PATENTS

| | | |
|---|---|---|
| 2,431,897 | Wensley | Dec. 2, 1947 |
| 2,579,180 | Eldred | Dec. 18, 1951 |
| 2,712,913 | Stanley | July 12, 1955 |
| 2,713,466 | Fletcher et al. | July 19, 1955 |
| 2,822,997 | Du Bois | Feb. 11, 1958 |
| 2,824,592 | Neisler et al. | Feb. 25, 1958 |

FOREIGN PATENTS

| | | |
|---|---|---|
| 311,099 | Germany | Feb. 19, 1918 |
| 536,225 | Great Britain | May 7, 1941 |

OTHER REFERENCES

Aviation Week, vol. 65, No. 22, Nov. 26, 1956, p. 3.